United States Patent
Ratte

[11] Patent Number: 6,161,326
[45] Date of Patent: Dec. 19, 2000

[54] FISHING LINE CLAMP

[76] Inventor: Geoffrey S. Ratte, 201 Brockenbraugh Ct., Metairie, La. 70005

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,950

[22] Filed: Jun. 3, 1997

Related U.S. Application Data

[63] Continuation-in-part of application No. 08/651,053, May 21, 1996, abandoned.

[51] Int. Cl.[7] .................................................. A01K 95/00
[52] U.S. Cl. .................. 43/44.91; 43/44.89; 43/42.39
[58] Field of Search ............................... 43/42.36, 42.39, 43/42.24, 42.08, 44.91, 44.89

[56] References Cited

U.S. PATENT DOCUMENTS

| | | | |
|---|---|---|---|
| 2,703,945 | 3/1955 | Johnson | 43/42.06 |
| 3,808,728 | 5/1974 | Ratte, Jr. | 43/44.91 |
| 4,145,833 | 3/1979 | Ratte | 43/44.89 |
| 4,167,076 | 9/1979 | Weaver | 43/42.36 |
| 4,459,775 | 7/1984 | Ratte | 43/44.89 |
| 4,615,136 | 10/1986 | Bank | 43/44.91 |
| 4,942,689 | 7/1990 | Link | 43/42.36 |
| 4,944,107 | 7/1990 | Wymore | 43/44.89 |
| 5,040,325 | 8/1991 | Herrmann | 43/42.36 |
| 5,129,175 | 7/1992 | Pixton | 43/42.36 |
| 5,203,107 | 4/1993 | O'Brien | 43/44.9 |
| 5,305,534 | 4/1994 | Lazich | 43/44.91 |
| 5,490,345 | 2/1996 | Infinger | 43/42.36 |

*Primary Examiner*—Kurt Rowan
*Attorney, Agent, or Firm*—Jacobson & Johnson

[57] ABSTRACT

A fishing line clamp with a tension adjusted hinge having line centering surfaces including a streamline clamp for attachment to a fishing line in front of a worm weight to prevent the worm weight from sliding along the fishing line with the clamp and worm weight coacting to present a streamline shape to inhibit action that might twist the line as the line and sinker are pulled through the water.

7 Claims, 4 Drawing Sheets

FISHING LINE CLAMP

CROSS REFERENCE TO RELATED APPLICATIONS

This application is a continuation in part of my U.S. patent application Ser. No. 08/651,053 filed May 21, 1996 titled FISHING LINE CLAMP.

FIELD OF THE INVENTION

This invention relates generally to clamps and, more specifically, to a line clamp for holding a slideable worm weight in a fixed position on a fishing line while inhibiting twisting action on the fishing line.

BACKGROUND OF THE INVENTION

The concept of worm weights and fishing rigs that use soft plastic worms is well known in the art. One of the more well known rigs is the Texas rig which uses a plastic worm, a slip sinker, called a worm weight, and a hook The hook is extended through the end of the plastic worm with the pointed end of the hook embedded in the plastic worm to make the worm rig less prone to snagging. The worm weight, which is centrally located on the line has a bullet like shape with a central opening and fits around the line with sufficient clearance so the sinker is free to slide up and down the line. However, when fishing in weeds the sliding worm weight can cause problems as the worm weight tends to get hung up in the weeds. In order to prevent the worm weight from sliding a clamp is used to hold the worm weight in position on the line. A prior art method of clamping the worm weight in position is accomplished by forcing a toothpick into the opening in the worm weight which jams the line against the interior passage in the worm weight thus preventing the worm weight from slipping on the line. The present invention comprises an improved clamp to hold the worm weight in position without having to use a toothpick to jam the line against the worm weight. The present invention provides a line clamp that can be attached to the line in front of the worm weight and because of the streamline shape on the exterior surface of the clamp the clamp coacts with the sinker shape to form a fishing rig that can be pulled through the water and weeds with a minimum of snagging or line twisting.

BRIEF DESCRIPTION OF THE PRIOR ART

U.S. Pat. No. 1,618,100 shows a fishing sinker with crevices for looping the fishing line around the sinker.

U.S. Pat. No. 2,735,652 shows a tear shaped fishing sinker where the line is looped around the sinker.

U.S. Pat. No. 2,741,067 shows a snap on sinker with a ring to hold the halves of the sinker in position on the fishing line.

U.S. Pat. No. 3,701,212 shows a salt water sinker with crimpable arms that prevents removal of the sinker from a line.

U.S. Pat. No. 4,145,833 shows a fishing sinker with two halves that can be clamped on a fishing line to hold a line and bait under water.

U.S. Pat. No. 4,279,092 shows a fishing weight having an insert therein for engaging a fishing line.

U.S. Pat. No. 4,459,775 shows a weedless sinker having nubs on each end of the sinker to fold over the line.

U.S. Pat. No. 4,837,966 shows a cam action fishing sinker device.

U.S. Pat. No. 4,891,903 shows a sliding or fixed fishing sinker where the line can be looped on the sinker to prevent the sinker from sliding.

U.S. Pat. No. 4,944,107 shows a fixed and sliding spherical fishing sinker for attachment to a fishing line by clamping the two halves to the fishing line.

U.S. Pat. No. 4,964,236 shows a fishing line sinker having a quick attachment device.

SUMMARY OF THE INVENTION

Briefly, the present invention comprises a streamline clamp for attachment to a fishing line in front of a worm weight to prevent the worm weight from sliding along the fishing line with the clamp and worm weight coacting to present a streamline shape to inhibit action that might twist the line as the line and sinker are pulled through the water.

DESCRIPTION OF THE PREFERRED EMBODIMENT

Figure 1:
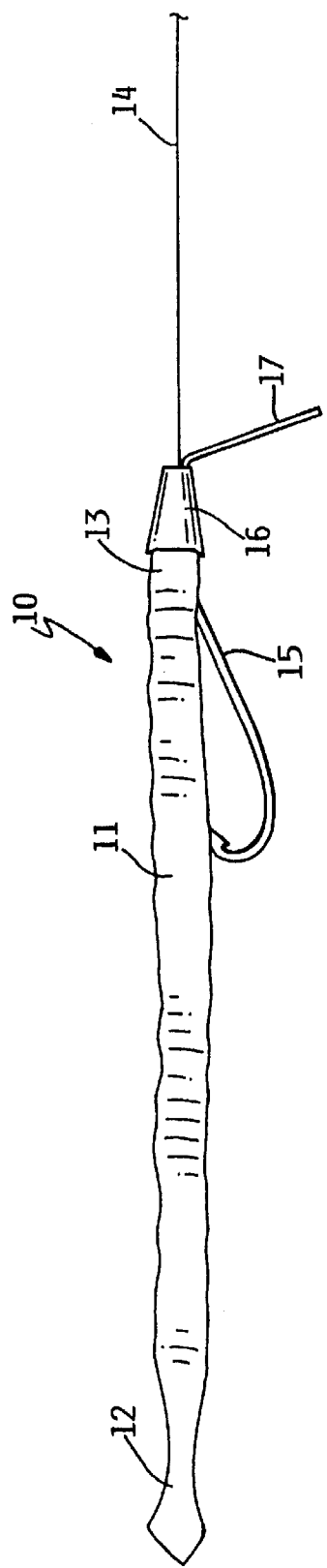
FIG. 1 shows a prior art Texas rig with the worm weight being secured in position with a toothpick.

FIG. 1 shows a Texas rig 10 for fishing with plastic worms or the like. The Texas rig includes a flexible plastic worm 11 having a head 13 and a tail 12. A hook 15 connects to one end of line 14 and extends through head 13 with the pointed end of hook 15 embedded in the worm to minimize snagging of the rig as it is pulled through the water. In order to maintain the plastic worm at the proper fishing depth a lead weight commonly referred to as a worm weight 16 is mounted on line 14 immediately in front of head 13. Worm weight 13 generally comprises a bullet shaped article with a line hole extending through the weight. FIG. 1 shows the prior art clamping device for securing the worm weight to line 13 comprising a breakable wood toothpick 17 which has had one end jammed into the opening of the worm weight that carries the fishing line. Once the toothpick is jammed in the opening the toothpick is broken off so that only a small portion of the toothpick protrudes from the worm weight.

Figure 2:
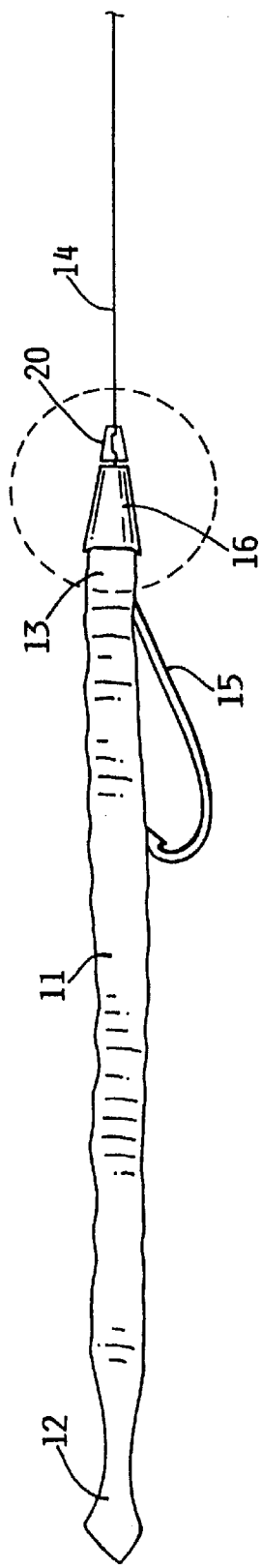
FIG. 2 shows the Texas rig of FIG. 1 with the line clamp of the present invention attached thereto to prevent the worm weight from sliding on the fishing line.

FIG. 2 shows the Texas rig 10 with line clamp 20 of the present invention located in front of worm weight 16.

Figure 3:
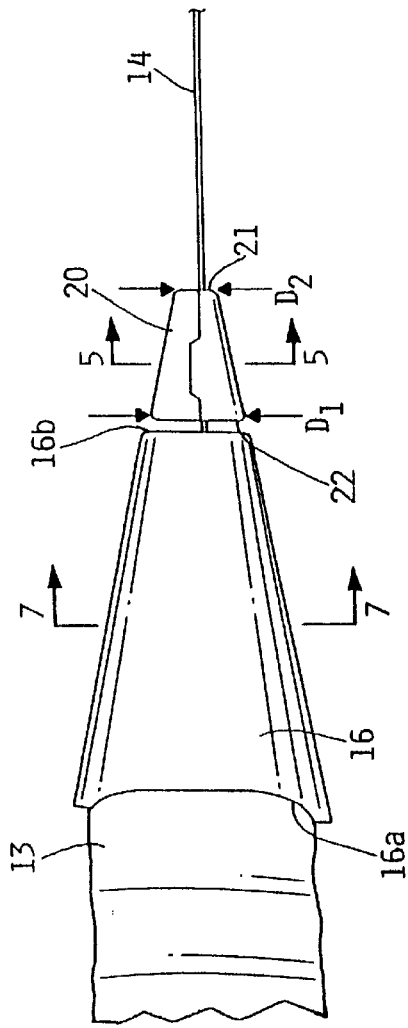
FIG. 3 shows an enlarged view of the portion of FIG. 2 outlined by dotted lines.

FIG. 3 shows line clamp 20 and the front portion of the Texas rig in greater detail with the neutral stop surface 22 having a diameter $D_1$ being smaller than a smallest cross-sectional dimension of the worm weight and the outer truncated core of the worm weight. Line clamp 20 is movable between an open condition (FIG. 6) and a closed condition, as shown in FIG. 2, for preventing worm weight 16 from sliding along fishing line 14. Line clamp 20 comprises a body of bendable material for circumferentially squeezing a fishing line with the line clamp having a first leading end 21, and a second larger end with the first end 21 of line clamp 20 being smaller in cross sectional area than the second end 22 when the line clamp is attached to a fishing line. Clamp 20 is characterized by being smaller than the worm weight and having an exterior surface with the exterior surface of the body smoothly converging from first end 21 to the second end 22 to form a streamline shape that inhibits twisting or propeller action of the clamp as the rig is pulled through the water. By inhibiting propeller action by the line clamp one inhibits line twisting which can lead to snarling of the line in the reel. The streamline shape of line clamp 20 is compatible with a streamline shape of a worm weight 16 so that when the line clamp 20 is positioned in front of worm weight 16 it not only acts as a stop for a worm weight 16 but the streamline shape of the body of line clamp 20 cooperates with the streamline shape of the worm weight 16 to produce a fishing rig that minimizes snagging as the rig is pulled through weeds.

Figure 6:
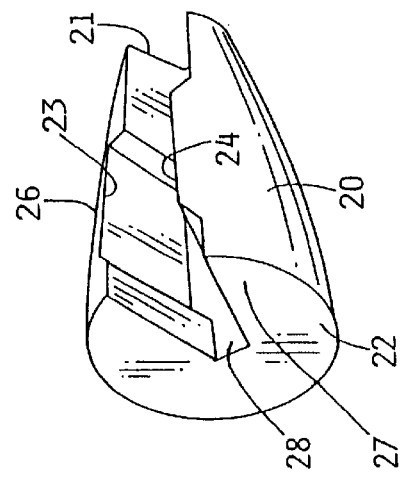
FIG. 6 is perspective view of the clamp of FIG. 2.

FIG. 6 shows line clamp 20 with bendable jaws 26 and 27 in the open condition. Line clamp 20 includes a first line gripping surface 23 extending to the geometric center of clamp 20 as defined by surface 28. Gripping surface 23 extend from the first end 21 to the second end 22 with second end 22 having a flat surface for allowing the worm weight to adopt a central position thereon. That is surface 27 by being symmetrical does not force the worm weight to follow there behind in an unusual angle. Line gripping surface 23 includes at least one recess surface and line griping surface 24 includes a raised surface that forms mating engagement with line gripping surface 24 to circumferentially grasp and lock a line therein by providing a nonlinear path through the line clamp. That is, when the line gripping surface 23 and line gripping surfaces 24 are in the closed condition they coact to grasp a fishing line located therein and prevent the slippage of the fishing line therein. As the jaws extend to the geometric center of the clamp a line placed in the bottom 28 of the clamp 20 will be positioned in the center of the clamp and will minimize the tendency of the clamp to act like a propeller as the clamp 20 is pulled through the water as well as minimizing snagging in the weeds. Jaws 23 and 24 are characterized by being asymmetrical in that the hinge region formed as the jaws 23 and 24 interact and vary from a first thickness to a second larger thickness.

Figure 4:
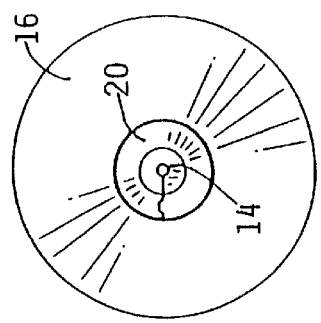
FIG. 4 shows an end view of the clamp and worm weight of FIG. 3.

FIG. 4 shows an end view of the worm weight and line with line clamp 20 located thereon. In this view one notes that the line clamp is considerably smaller than the worm weight and has diverging sides that diverge outward in the same manner as the sides of worm weight 16 to produce a rig that can be pulled through the weeds with a minimum of snagging.

Figure 7:
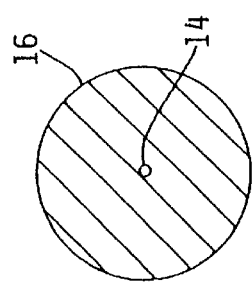
FIG. 7 is a cross sectional view taken along lines 7—7 of FIG. 3.

FIG. 7 shows a cross sectional view taken along lines 7—7 of FIG. 3 to illustrate the worm weight 16 is a solid piece of material with a central opening therein for a fishing line. It should be kept in mind that the worm weight is placed on the line for weight and although the line clamp 20 has an incidental weight it is the central clamping action of the line clamp that performs the line holding function. Line Clamp 20 includes an outer truncated cone shape with a neutral stop surface 22 to prevent sliding of the worm weight along the fishing line. Surface 20 is a neutral stop surface as surface 22 does not force the worm weight askew of the fishing line by a clamp that would provide a guide surface that directs either of the clamp or the worm weight to a path which is not parallel to the fishing line.

Figure 5:
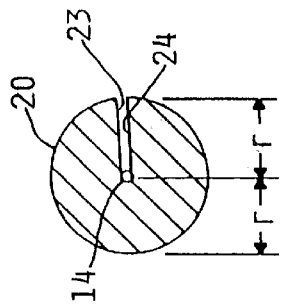
FIG. 5 shows a sectional view taken along lines 5—5 of FIG. 3.

FIG. 5 is a cross sectional view taken along lines 5—5 of FIG. 3 to illustrate that the surfaces 23 and 24 are in mating engagement with each other and that line 14 is located in the center of clamp 20 as indicated by the equal dimensions "r" extending radially outward from fishing line 14 which is located in the center of clamp 20.

As can be seen from the drawings, line clamp 20 is made from a nonresilient material which can be bent around the line, preferably by finger pressure. Suitable materials are plastics and certain metals. If the worm weight is made of lead a suitable materiel for making the line clamp, could be lead; however, the line clamp like the hook is not on the line to provide weight but is attached to the line to grasp the line and prevent the worm weight from sliding while creating a generally streamline shaped stop that is not prone to acting like a propeller. Line clamp 20 when used in conjunction with a worm weight should be made sufficiently small so that the weight of the line clamp 20 is insufficient to act or perform as a weight for the fishing rig.

Figure 8:
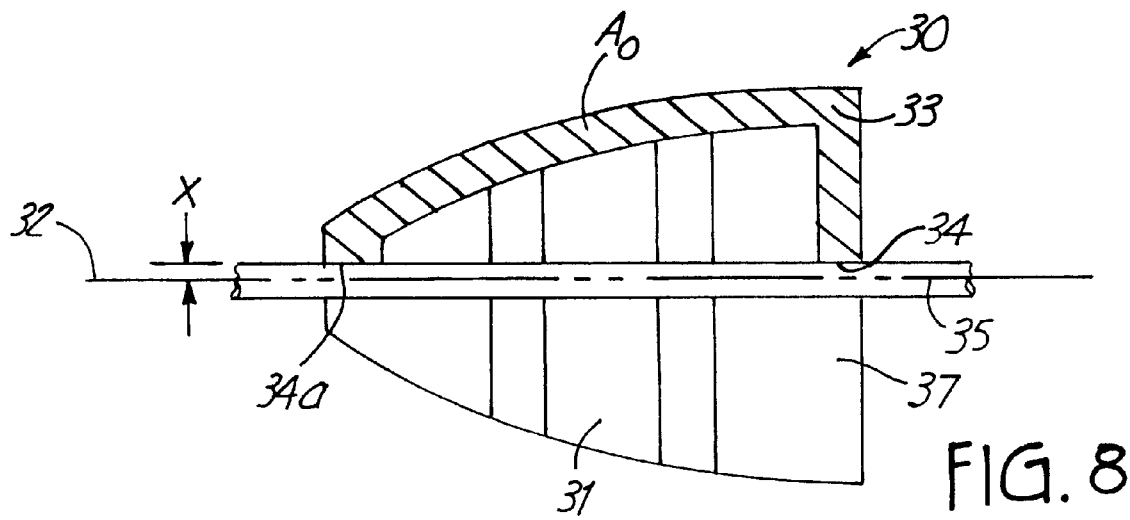
FIG. 8 is cross sectional view of a first half of a line clamp showing a peripheral hinge.
Figure 9:
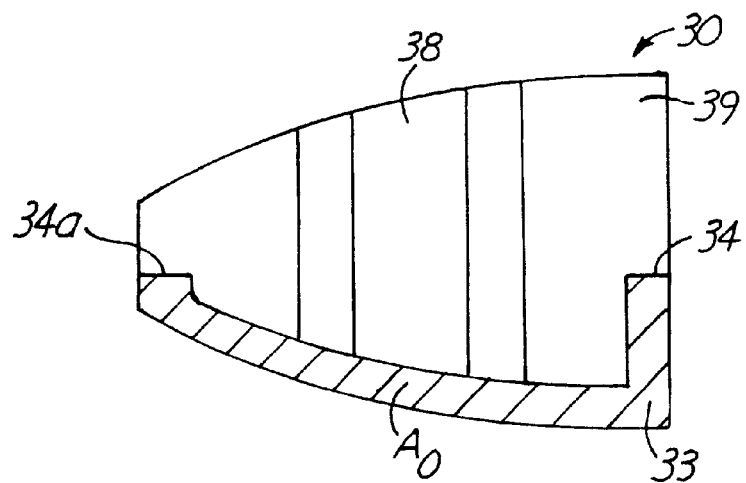
FIG. 9 is a cross sectional view of the other half of line clamp of FIG. 8.

FIG. 8 shows a sectional view of one half of a tension adjusted line clamp or sinker stopper 30 and FIG. 9 shows a sectional view of the other half of a tension adjusted line clamp or sinker stopper 30 with an elongated integral peripheral hinge 33 (shown in section) for connecting the two halves together. One half of sectioned sinker stopper is identified by numeral 37 and is shown in FIG. 8 and the other half of sectioned sinker stopper is identified by reference numeral 39 and is shown in FIG. 9. In order to reveal the interior of sinker stopper 30 the sinker stopper has been sectioned axially and each of the halves 37 and 39 are shown in a plane view with the common connecting region 33, which forms a tension adjusted peripheral hinge 33, having an area $A_o$ and line centering surfaces 34 and 34a located on opposite ends of hinge 33. The use of a controlled connecting area $A_o$ allows one to preset the tension force necessary to open and close the two halves of the sinker stopper 30 and still maintain the streamline exterior that prevents twisting. That is, with a larger area $A_o$ the sinker stopper is more difficult to open and close and with a smaller area $A_o$ the sinker stopper is less difficult to open and close. Consequently, one can form a sinker stopper of various sizes that are suitable for squeezing around a fishing line without undue finger pressure. In addition the use of line centering surfaces 34 and 34a located on peripheral hinge 33 maintain the line 35 in a centered condition within sinker stopper 30.

FIG. 8 shows that a protrusion 31 extends from the hinge area 33 to the opposite edge of sinker stopper and FIG. 9 shows that a mating recess 38 extends from hinge 33 to the opposite side of sinker half 39.

Figure 10:
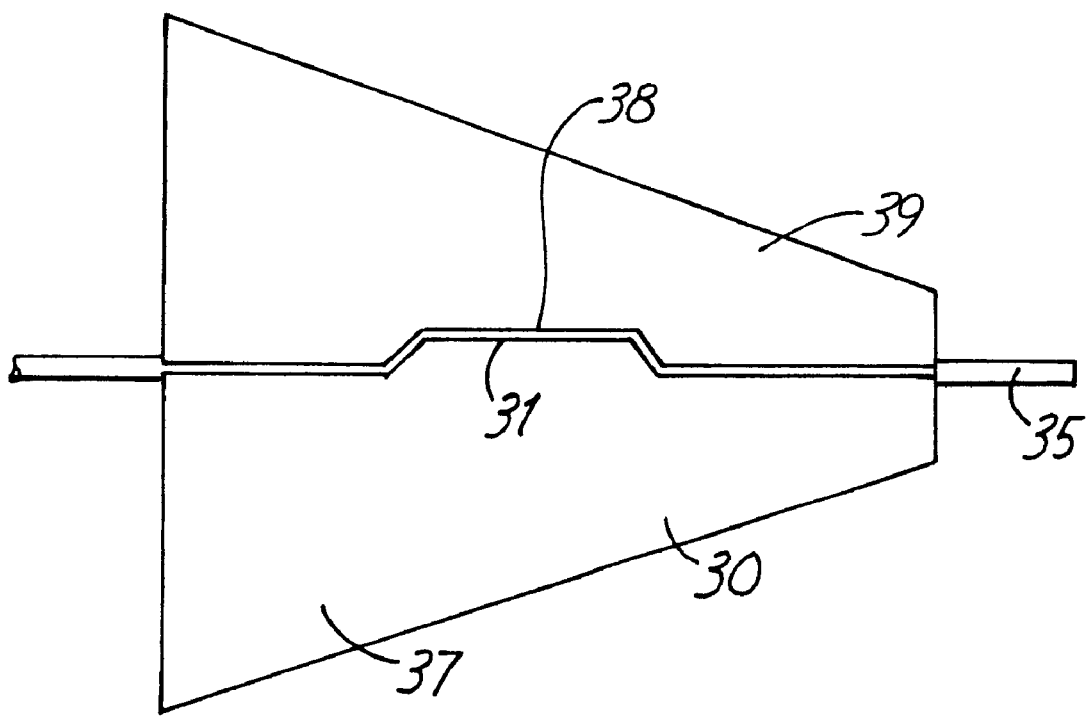
FIG. 10 is an assembled view of the line clamp of FIG. 8 and FIG. 9.

FIG. 10 shows a top view of sinker stopper 30 in the unsectioned condition with protrusion 31 on sinker half 37 engaging recess 38 on sinker half 39.

In the embodiment 30 the sinker stopper provides line centering capabilities through line centering surfaces 34 and 34a which are spaced a distance "x" from a center line 35. That is the line centering surfaces can be spaced a distance generally equal to half the thickness of the fishing line in order to ensure that the sinker stopper is centered on the line. With use of small diameter lines the line centering surfaces 34 and 34a can be placed on the geometric center defined by central axis 32 without affecting the balance of the sinker stopper 30.

A further feature of the invention is that the peripheral hinge with surface stops 34 and 34a can be formed by forcing a knife-like blade into the central portion of the line clamp 30 sufficiently far so as to form the peripheral hinge 33.

I claim:

1. In combination:

a streamline worm weight having a front end and a back end, said worm weight having a line hole extending therethrough to enable said worm weight to slide along a fishing line; and a one piece line clamp of finger bendable nonresilient material, said clamp located free of and external to said worm weight to form a stop to prevent sliding of said worm weight past said clamp, said clamp having a neutral stop surface for slide stopping engagement with the front end of the worm weight to prevent forcing the worm weight askew of the fishing line, a first end and a second end with the first end of said clamp being smaller than said second end with the clamp smoothly converging from said first end to said second end to form a streamline outer truncated cone shape that inhibits snagging and propeller action as the clamp is pulled through a fluid, said streamline outer truncated cone shape of said clamp compatible with a streamline shape of the worm weight so that when the clamp is positioned as a stop the clamp remains in front of the worm weight so that the streamline shape of the clamp and the streamline shape of the worm weight cooperate to allow the clamp and the worm weight to be pulled through weeds without snagging the worm weight and the clamp thereon;

a first jaw having a line gripping surface on said clamp, said first line gripping surface extending from said first end to said second end, said first line gripping surface including at least one protrusion, said line gripping surface having a portion extending proximate a geometric center of said line clamp;

a second jaw having a second line gripping surface on said clamp, said second line gripping surface extending from said first end to said second end with said second line gripping surface including a recess mateable with said protrusion to produce a nonlinear path through said clamp so that when said second line gripping surface and said first line gripping surfaces are squeezed together the first line gripping surface and the second line gripping surface coact to to circumferentially squeeze and maintain the fishing line in the geometric center of the clamp to prevent the slippage of the fishing line therein and to minimize the tendency of the clamp to act like a propeller; and a tension adjusted peripheral hinge connecting said first jaw to said second jaw to maintain said first line gripping surface in gripping engagement with said second line gripping surface.

2. The line clamp of claim 1 wherein the clamp is made of lead.

3. The line clamp of claim 1 wherein the clamp is a continuous integral member.

4. The line clamp of claim 1 wherein the line clamp has an exterior diverging surface and a set of jaws that extend the entire length of the line clamp.

5. The line clamp of claim 1 wherein the line clamp is one piece and includes two jaws extending to a geometric center of said line clamp with said jaws are movable between an open condition and a closed condition by pivoting the jaws.

6. A fishing rig comprising:

a fishing line;

a fish hook having a pointed end and a second end attached to said fishing line;

an elongated flexible worm material having a head and a tail, said fish hook and said fishing line extending through the head of the worm material with the pointed end of the fish hook embedded in the flexible worm;

a worm weight, said worm weight having a line hole with the worm weight located in a first position on said fishing line with the worm weight slidable along said line with the worm weight engaging the head of said elongated flexible worm material and a non-resilient one-piece line clamp, said non-resilient, one piece line clamp having a first jaw and a second jaw with said one-piece line clamp smaller than said worm weight, said non-resilient, one piece line clamp centrally securing the non-resilient, one piece line clamp to a second postion on the fishing line with the non-resilient, one piece line clamp located entirely in front of the worm weight to form a stop to prevent sliding of said worm weight along said fishing line, with the non-resilient, one piece line clamp having an elongated peripheral hinge bendable between an open condition and a closed condition with the closed condition of the line clamp circumferentially clamping the fishing line to prevent slippage therethrough and having a streamline shape that inhibits the line clamp from a propeller like action as the fishing line is pulled through a body of water, said peripheral hinge including line centering surfaces spaced proximate a geometric center of said line clamp; and a neutral surface on said non-resilient, one piece line clamp to engage said worm weight to prevent the worm weight from sliding along said fishing line without forcing the worm weight askew of the fishing line.

7. The fishing rig of claim 6 including a protrusion and mating recess with the protrusion and the recess extending past the geometric center to a position proximate said peripheral hinge.

* * * * *